United States Patent [19]

Kerr

[11] Patent Number: 4,648,099

[45] Date of Patent: Mar. 3, 1987

[54] DIGITAL MINIMUM SHIFT KEYED MODULATOR

[75] Inventor: Leo A. Kerr, Woodstock, Md.

[73] Assignee: Allied Corporation, Morristown, N.J.

[21] Appl. No.: 682,628

[22] Filed: Dec. 17, 1984

[51] Int. Cl.⁴ ............................................. H04L 27/12
[52] U.S. Cl. ....................................... 375/47; 375/64; 332/16 R
[58] Field of Search ................... 375/1, 38, 45, 47, 49, 375/64, 88, 90; 332/16 R; 329/131

[56] References Cited

U.S. PATENT DOCUMENTS

| | | | |
|---|---|---|---|
| 4,327,439 | 4/1982 | Göckler et al. | 375/39 |
| 4,500,856 | 2/1985 | Childs | 375/47 |
| 4,539,533 | 9/1985 | French | 375/47 |

OTHER PUBLICATIONS

*Digital Communications by Satellite*, Bhargaua et al., Wiley & Sons, 1981, Chapter 9, Section 9.1.
W. R. Smith, "SAW Filters for CPSM Spread-Spectrum Communications:"-Hughes Aircraft Co., dated-1977 Ultrasonics Symposium Proceedings, IEEE Group on Sonics & Ultrasonics, Oct. 26-28, 1977 at Phoenix, Arizona, pp. 524-528.

*Primary Examiner*—Robert L. Griffin
*Assistant Examiner*—Raymond C. Glenny
*Attorney, Agent, or Firm*—Bruce L. Lamb; Robert M. Trepp

[57] ABSTRACT

A digital minimum shift keyed modulator (MSK) has been described incorporating a code generator for generating a plurality of bits in series representative of a spreading function, an Exclusive OR circuit for multiplying two successive bits, a memory for holding predetermined constants, timing circuitry, a digital-to-analog voltage converter and a bandpass filter. The invention overcomes the problem of variations over frequency and temperature associated with previous MSK modulator designs.

24 Claims, 25 Drawing Figures

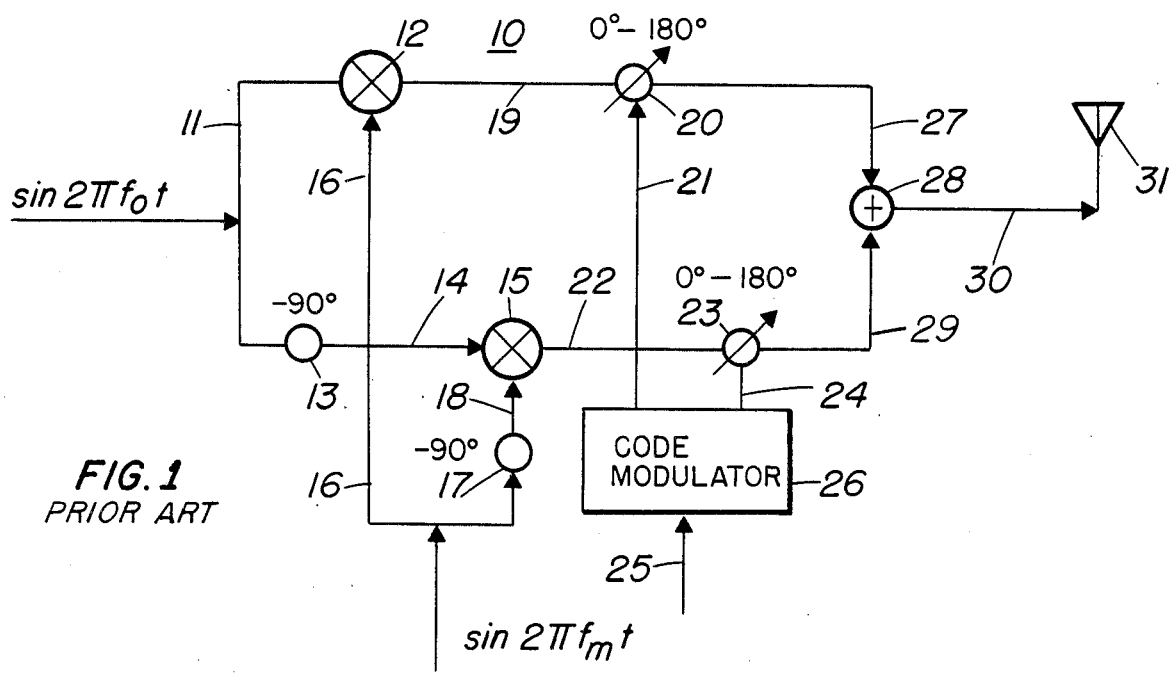
FIG. 1 PRIOR ART
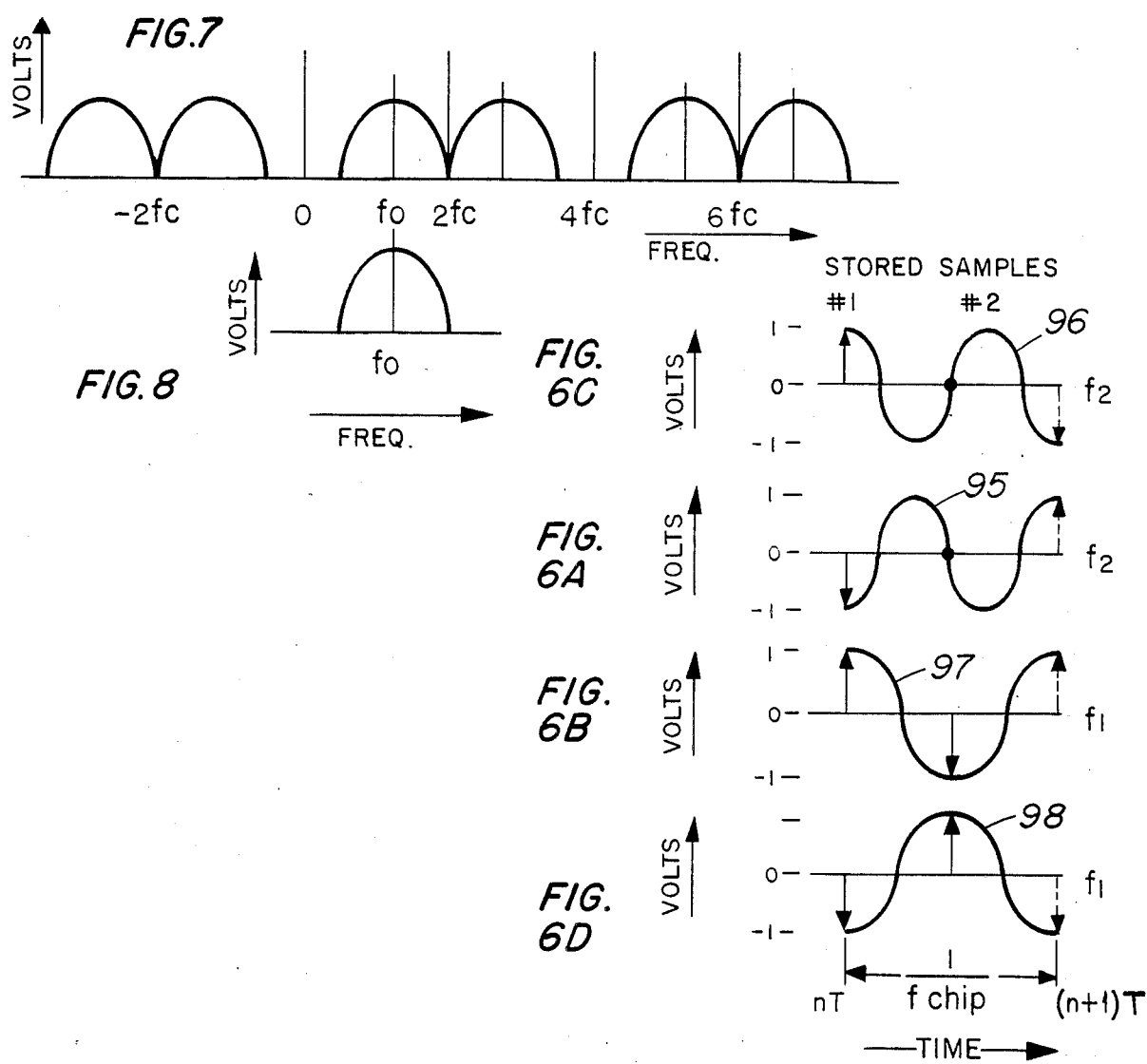

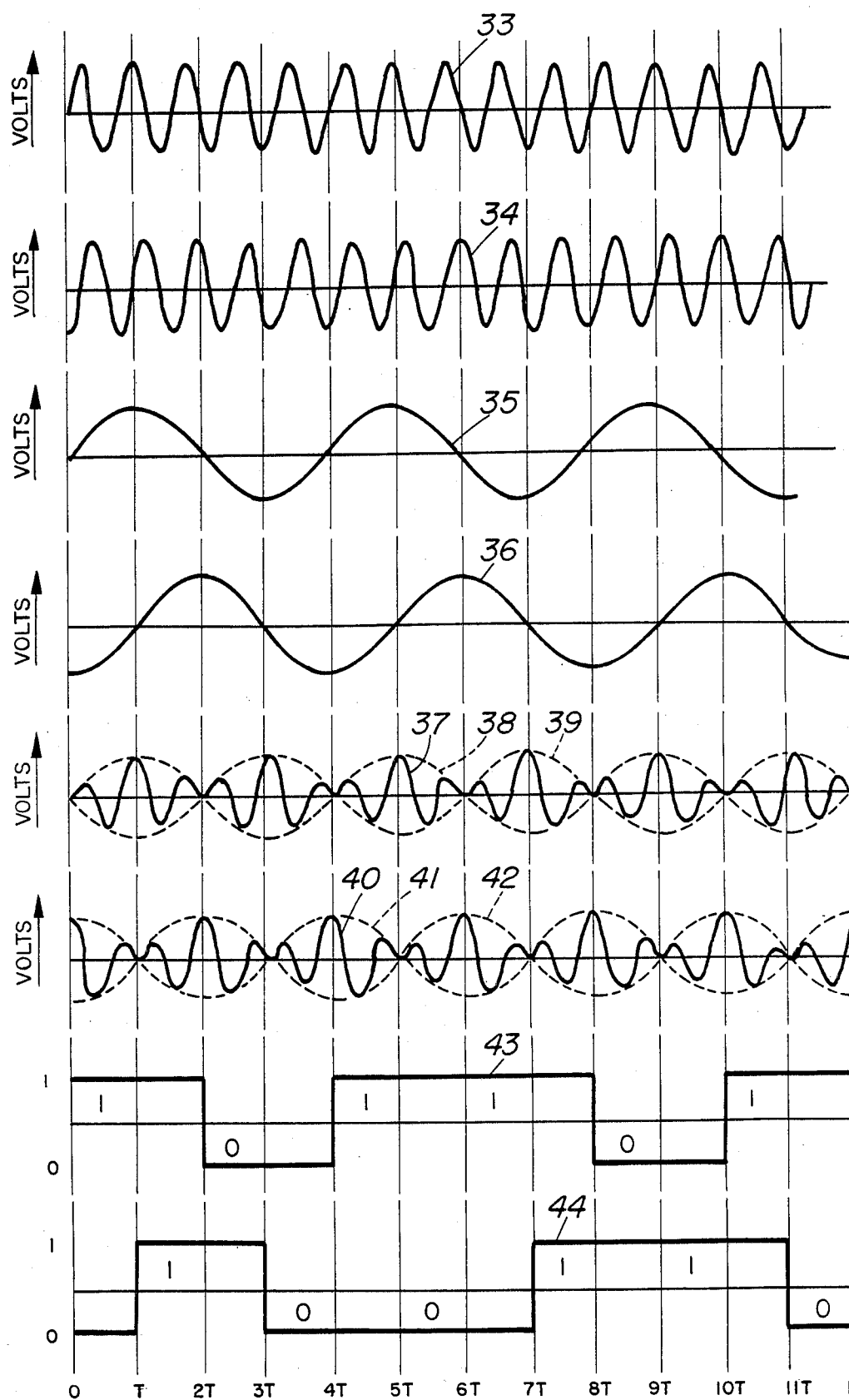

4,648,099

DIGITAL MINIMUM SHIFT KEYED MODULATOR

BACKGROUND OF THE INVENTION

1. Field of the Invention

This invention relates to spread spectrum communication equipment and more particularly to a minimum shift keyed modulator.

2. Description of the Prior Art

Recent progress in coded, spread-spectrum communication systems has pointed up the need to avoid spillage of energy from one communication channel into the frequency band allocated for adjacent and nearby communication channels, such as tactical communication and navigation systems (TACAN) and other equipment. This is the principal reason for the increasing usage of minimum shift keyed (MSK) waveforms, also known as continuous phase shift modulated (CPSM) waveforms for direct sequence coding in spread-spectrum communication systems.

Continuous phase shift modulated spread-spectrum waveforms consists of a sequence of contiguous pulses, each of which is a short pulse at one of two different frequencies. They have the advantage of lower spectral side lobes, and thus lower cross-channel interference, than phase shift keyed (PSK) waveforms.

In a publication by W. R. Smith entitled "SAW Filters for CPSM Spread-Spectrum Communications", 1977 Ultrasonics Symposium Proceedings, IEEE Group on Sonics & Ultrasonics, Oct. 26–28, 1977 at Phoenix, Ariz., pp. 524–8, two methods are described for generating CPSM waveforms. The first method is by direct synthesis without surface acoustic wave (SAW) filters. In direct synthesis, the carrier portion of these waveforms is generated by an i.f. oscillator. A 90° phase shifter provides the in-phase and quadrature components of the carrier frequency. A modulation frequency is obtained by narrow band filtering two of four phase outputs of a divide-by-four circuit which is driven by a square wave generator of period T. The output of each filter is coupled to respective mixer. One mixer has a second input coupled to the carrier frequency and the second mixer has a second input coupled to the quadrature phase of the carrier frequency. A spreading function or input code is stretched in time by a factor of two and split into two sequences, one consisting of the odd numbered chips and the other consisting of the even numbered chips. The odd and even numbered chips are coupled to the inputs of two additional mixers having the second input coupled to the output of in-phase and quadrature components of the modulated carrier. The output of the two additional mixers is summed to provide a single output. The message to be transmitted is usually superimposed by simple modulo-2 addition to the code at the input.

The second method for generating CPSM waveforms is by CPSM synthesis using a surface acoustic wave (SAW) filter. A spreading function or input coded pulse train is mixed with a carrier frequency in a mixer to provide a phase shift keyed signal. The phase shift keyed (PSK) signal has chips having duration T. The PSK waveform is introduced into a SAW filter, whose impulse response is given to a good approximation by $H(T) = \sin(2\pi f_2 t)$, for $0 \leq t < T$ and 0, otherwise.

The modulator with the SAW filter is obviously much simpler, smaller and less expensive than the direct synthesis circuit. Furthermore, the critical time alignment problems associated with the direct-synthesis circuit have virtually no counterpart in the SW filter approach.

It is therefore desirable to provide an MSK waveform by direct synthesis using digital circuitry.

It is further desirable to provide digital circuitry for generating MSK waveforms to avoid the use of SAW device which is subject to: temperature stability, the initial cost and frequency range.

It is further desirable to provide digital circuitry for the direct synthesis of MSK waveforms to avoid the limitations of frequency and phase stability associated with a local oscillator.

SUMMARY OF THE INVENTION

An apparatus and method is described for generating a minimum shift keyed waveform comprising means for generating a first plurality of bits in series representative of a binary code or spreading function, circuitry for multiplying the bit in each bit position of the first plurality of bits by the bit in the prior bit position to provide a second plurality of bits in series, circuitry for generating a plurality of predetermined binary constants in response to the value of each of the second plurality of bits in series and to the value of adjacent preceding bit of the second plurality of bits, an analog to digital converter for generating an analog voltage from the predetermined binary constants, and a clock signal and gate for coupling at a predetermined time the analog voltage to a bandpass filter having a predetermined frequency bandpass.

DESCRIPTION OF THE DRAWING

FIG. 1 is a schematic diagram of an apparatus for generating MSK waveforms.

FIGS. 2A–2L show typical waveforms at circuit nodes within the apparatus of FIG. 1.

FIGS. 6A–6D show curves of stored sampled segments.

FIG. 7 is a curve of the amplitude versus frequency at the input of the bandpass filter in FIG. 5.

FIG. 8 is a curve of the amplitude versus frequency at the output of the bandpass filter in FIG. 5.

DESCRIPTION OF THE PREFERRED EMBODIMENT

Figure 2I:
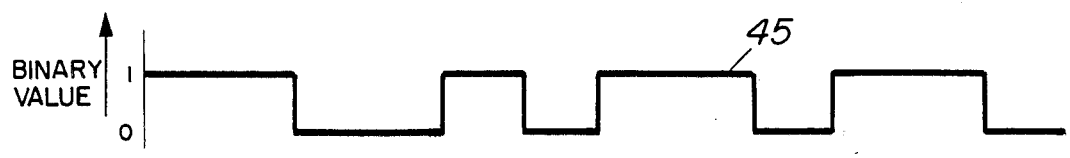
Figure 2J:
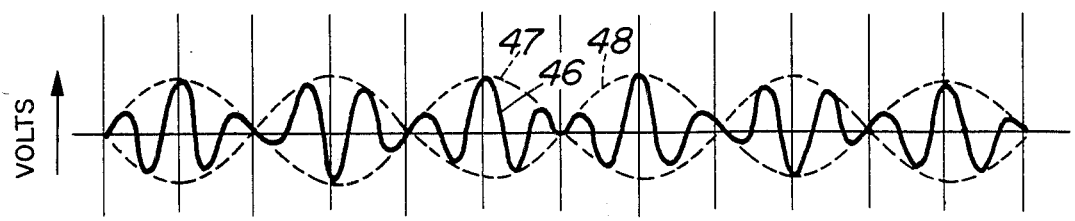
Figure 2K:
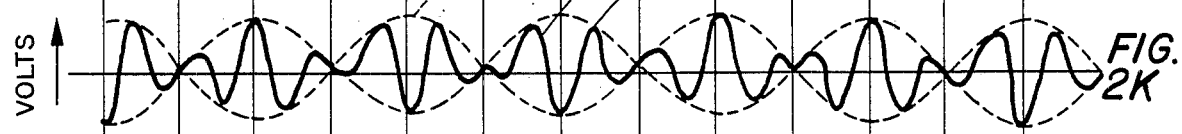

Referring to FIG. 1, waveform generator 10 of the prior art is shown for generating minimum shift keyed spread spectrum waveforms. An input signal is coupled over line 11 to an input of mixer 12 and an input of phase shifter 13. The input signal may be represented by sin $2\pi f_0 t$ which is shown by curve 33 in FIG. 2A. In FIGS. 2A–2L the ordinate represents voltage and the abscissa represents time. Phase shifter 13 functions to provide a −90° phase shift to the input signal. The output of phase shifter 13 is coupled over line 14 to an input of mixer 15. The signal on line 14 may be represented by $\sin(2\pi f_0 t - \pi/2)$ which is equal to $-\cos(2\pi f_0 t)$ which is shown by curve 34 in FIG. 2B. A modulation frequency signal, represented by sin $2\pi f_m t$ is coupled over line 16 to a second input of mixer 12 and through phase shifter 17 over line 18 to a second input of mixer 15. Phase shifter 17 may, for example, provide a −90° phase shift to the modulation frequency signal. The waveform on line 16 is shown by curve 35 in FIG. 2C and the waveform on line 18 is shown by curve 36 in FIG. 2D. The output of mixer 12 is coupled over line 19 to an input of phase shifter 20. Phase shifter 20 may provide a phase shift to the frequency $f_0$ of zero or 180°, depending upon the control signal to phase shifter 20 on line 21. The output of mixer 15 is coupled over line 22 to an input of phase shifter 23. Phase shifter 23 provides a phase shift to the frequency $f_0$ of zero or 180°, depending upon the control signal on line 24. An example of the waveforms on lines 19 and 22 are shown by curves 37 and 40 in FIGS. 2E and 2F, respectively. An example of the waveforms on lines 21 and 24 are shown by curves 43 and 44 in FIGS. 2G and 2H, respectively. A code, such as 110010110110 is coupled over line 25 to an input of code modulator 26. The waveform of the code coupled on line 25 may be shown, for example, by curve 45 in FIG. 2I. Code modulator 26 functions to couple alternating bits of the code on line 25 to lines 21 and 24. The code change on line 21 occurs every 180° of the modulation frequency $f_m$ and is synchronized to occur when the waveform crosses zero. Likewise, the code on line 24 changes every 180° of $f_m$ and is synchronized to occur when the waveform on line 22 crosses zero. The output of phase shifter 20 is coupled over line 27 to an input of adder 28. The output of phase shifter 23 is coupled over line 29 to a second input of adder 28. Adder 28 functions to combine the waveforms on lines 27 and 29, which are shown by curves 46 and 49 in FIGS. 2J and 2K, respectively. The output of adder 28 is coupled over line 30 to antenna 31, which radiates the signal on line 30. The MSK signal on line 30 is shown by curve 152 in FIG. 2L.

Figure 2L:
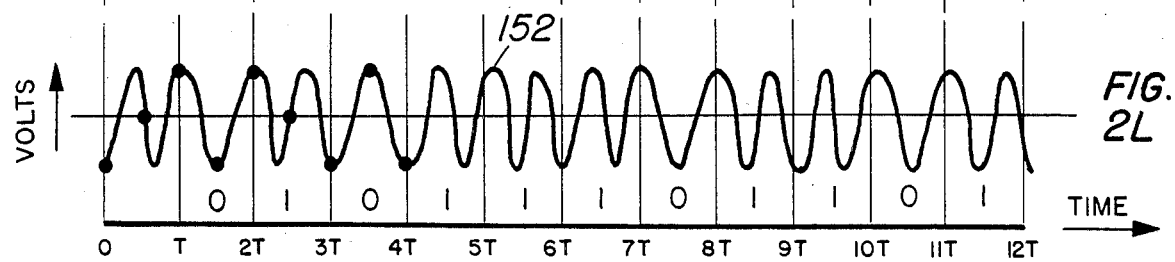

Curves 43 and 44 shown in FIGS. 2G and 2H result in the frequency shift keyed signal curve 152 in FIG. 2L. If the product of curves 43 and 44 in FIGS. 2G and 2H is minus, during an interval T curve 152 in FIG. 2L is of the frequency $f_2$ during that interval T. If the product of curves 43 and 44 is plus, curve 152 in FIG. 2L is of the frequency $f_1$. Frequencies $f_1$ and $f_2$ are defined by equations (1) and (2), $$f_1 = f_0 - f_m + \phi \tag{1}$$

$$f_2 = f_0 + f_m + \phi \tag{2}$$

where $f_0$ is the apparent carrier frequency and $f_m$ is equal to $f_c/4$. In equation (1), $f_c$ is equal to $1/T$ which is equal to the chipping rate and $\phi$ is equal to the carrier phase for no discontinuities.

Since there are no phase discontinuities in the waveforms 37 and 40, shown in FIGS. 2E and 2F, and since waveforms 43 and 44, shown in FIGS. 2G and 2H, supply only a 0 or 180° phase shift, $\phi$ is limited to two values for $f_1$ and two values for $f_2$. As can be seen by curve 152 in FIG. 2L, there are only four different voltage segments, each one chip period long. The voltage segment occurring between 0 and T is described by equation (3).

$$V = -\cos 2\pi(f_0 + f_m)t \tag{3}$$

The voltage segment occuring between T and 2T is described by equation (4).

$$V = \cos 2\pi(f_0 - f_m)t \tag{4}$$

The voltage segment occurring between 2T and 3T is shown in equation (5).

$$V = \cos 2\pi(f_0 + f_m)t \tag{5}$$

The voltage segment occurring between 3T and 4T is shown in equation (6).

$$V = -\cos 2\pi(f_0 - f_m)t \tag{6}$$

In equations (3)–(6), $f_m$ is equal to $F_c/4$. $f_c$ is equal to the chipping rate. The apparent carrier frequency $f_0$ is defined by equation (7), $$f_0 = (4N+1)f_c/4 \tag{7}$$

where N is an integer.

Figure 3A:
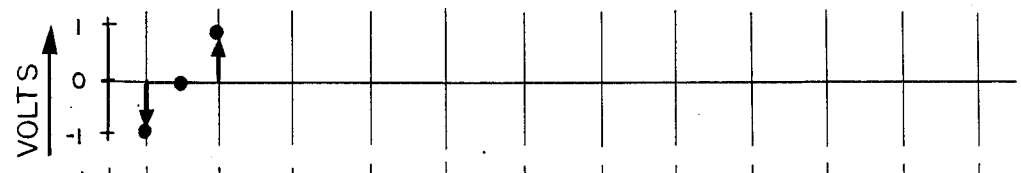
FIGS. 3A–3D show sampled segments of the waveform shown in FIG. 2L.
Figure 3B:
Figure 3C:
Figure 3D:
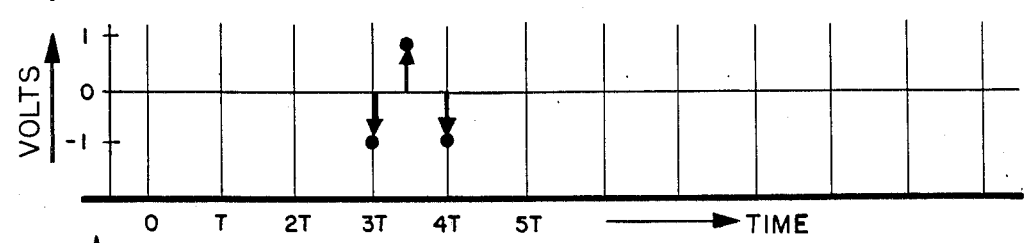

The voltage segments defined by equations (3)–(6) and shown by curve 152 in FIG. 2L may be sampled at twice the chip rate, such as at 0, T/2 and T, as shown in FIG. 3A. The voltage samples occurring between T and 4T are shown in FIGS. 3B–3D. In FIGS. 3A–3D, the ordinate represents voltage and the abscissa represents time. As may be seen in FIGS. 3A–3D the voltage samples are unique for each voltage segment defined by equations (3)–(6).

Figure 4:
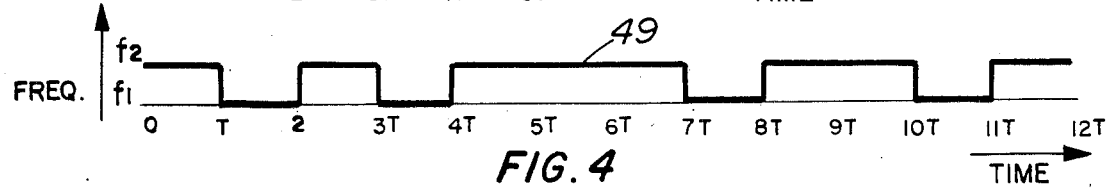
FIG. 4 is a curve showing the frequency versus time of the waveform in FIG. 2L.

Referring to FIG. 2I, curve 45 shows the binary code waveform used to generate curves 43 and 44 in FIGS. 2G and 2H, which resulted in curves 152 in FIG. 2L. FIG. 4 shows curve 49 which shows the frequency versus time of curve 152 in FIG. 2L in each time interval T. In FIG. 4 the ordinate represents frequency and the abscissa represents time.

Figure 5:
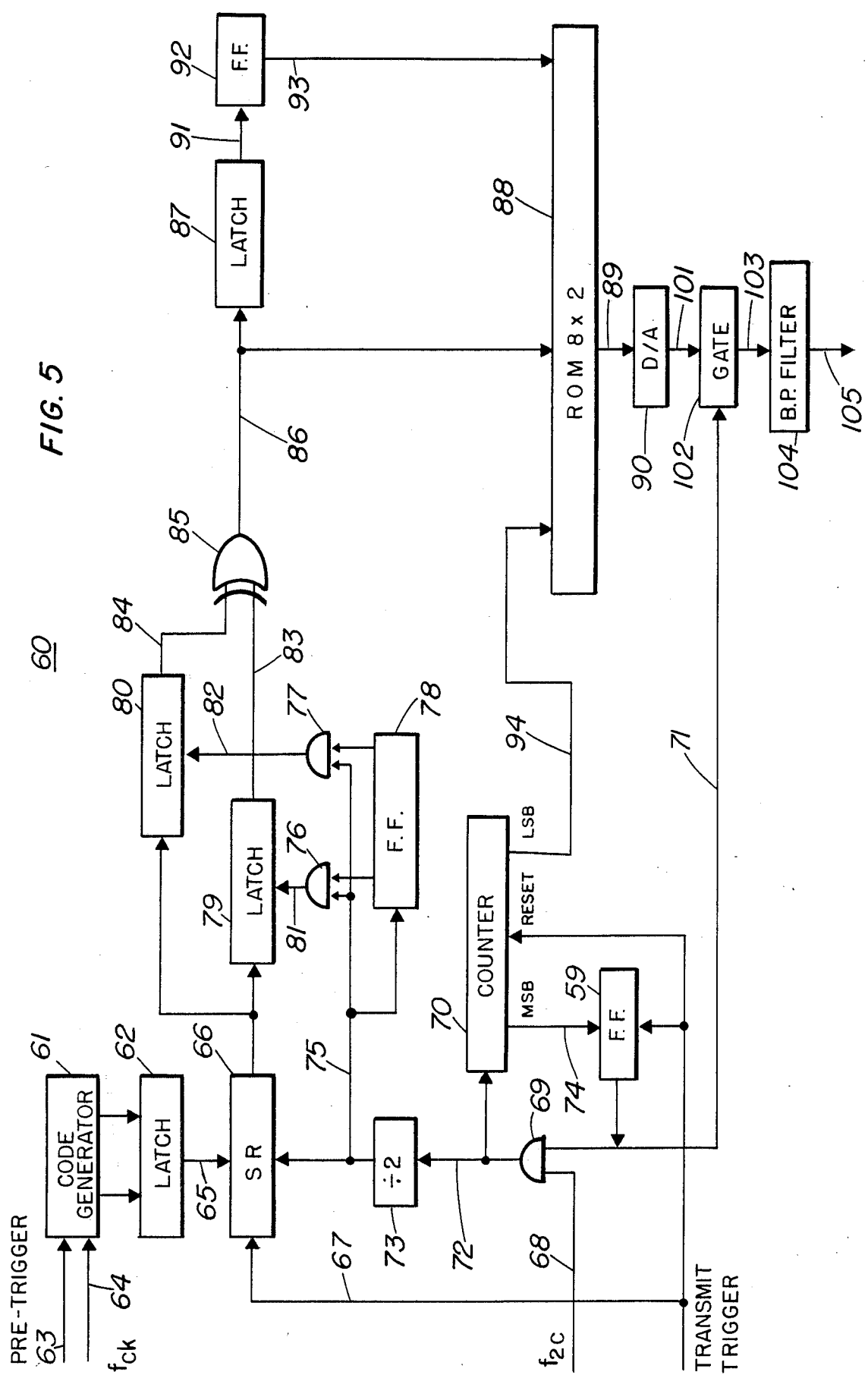
FIG. 5 is a block diagram of one embodiment of the invention.

FIG. 5 is a block diagram of a minimum shift keyed generator 60. In FIG. 5, a code generator 61 generates a spreading function or code and stores the code in latch 62. A control signal Pre Trigger is coupled over line 63 to an input of code generator 61. A clock $f_{ck}$ is coupled over line 64 to an input of code generator 61. The code in latch 62 is coupled over line 65 to shift register 66. Shift register 66 may be, for example, a 64 bit parallel in serial out shift register which may be loaded by each transmit Trigger control signal coupled over line 67. The code loaded in shift register 66 may correspond to, for example, curve 45 in FIG. 2I. A clock signal $f_{2c}$ is coupled over line 68 to an input of AND gate 69. Control signal Transmit Trigger is also coupled over line 67 to the set input of flip flop 59 and to the reset input of counter 70. To generate minimum shift key modulation for the stored code in shift register 66, control signal Transmit Trigger on line 67 causes flip flop 59 to set to a 1 having an output on line 71 and to reset counter 70. The output of flip flop 59 is coupled to a second input of AND gate 69, causing clock pulses on line 68 to pass through AND gate 69 and over line 72 to the clock input of counter 70 and to a divide-by-two circuit 73. The clock pulses on line 68 from signal $f_{2c}$ is at twice the chipping rate causing counter 70 to count at twice the chipping rate. An output from counter 70 occurs on line 74 when counter 70 counts to 128. Flip flop 59 is then reset causing the output of flip flop 59 to be a 0 which inhibits any further clock pulses from passing through AND gate 69. The 128 clock pulses that pass through AND gate 69 are divided by divide by two counter 73. The output of divide-by-two counter 73 is coupled over line 75 to the clock input of shift register 66 and to an input of AND gates 76-77 and flip flop 78. The 64 clock pulses from divide by two counter 73 causes shift register 66 to shift the code or signal chips from shift register 66 to an input of latches 79 and 80. The 64 clock signals on line 75 are also applied to AND gates 76-77 and flip flop 78. Flip flop 78 alternately enables AND gates 76 and 77 to pass alternate clock signals on line 75 to the clock input of latches 79 and 80 over lines 81 and 82, respectively. The alternating clock signals on lines 81 and 82 cause the latches to pass every other code bit from shift register 66 and to stretch the code bit by one chip period. These signals correspond to waveforms 43 and 44 in FIGS. 2G and 2H. The output of latches 79 and 80 are coupled over lines 83 and 84 to respective inputs of Exclusive OR circuit 85. Exclusive Or circuit 85 functions to produce the product of the two waveforms on lines 83 and 84 curves 43 and 44 in FIGS. 2G and 2H, with the ones and zeroes corresponding to plus ones and minus ones, respectively. The product or output of Exclusive OR circuit 85 is coupled over line 86 to an input of latch 87 and to an address input of memory 88. Memory 88 may be, for example, a read only memory having an output coupled over line 89 to an input of digital-to-analog converter 90. The output of Exclusive OR circuit 85 provides the address to access frequency $f_2$ for a 1 and $f_1$ for a 0, from memory 88. The output on line 86 is shown by curve 49 in FIG. 4. Latch 87 functions to hold the previous output of Exclusive OR circuit 85 and to couple it over line 91 to the control input of JK flip flop 92. When the input on line 91 is a 1, flip flop 92 changes state providing an output over line 93 to a second address input of memory 88. When the input on line 91 is a 0, flip flop 92 remains the same and the output on line 93 is unchanged.

An output of counter 70 which may, for example, be the least significant bit is coupled over line 94 to a third address input of memory 88. Memory 88 has stored therein a plurality of predetermined constants which may be recalled, depending upon the address on lines 86, 93 and 94. Memory 88 may, for example, hold sample segments of curve 152 in FIG. 2L which are shown in FIGS. 3A-3D. Since the amplitude at the transition from one sampled segment to the next must be identical to prevent phase discontinuities, only two samples of each segment must be stored corresponding to the first two samples of each segment shown in FIGS. 3A-3D. Of course, additional samples may also be stored in memory 88. Since the transition sample must be common to adjacent segments, this requirement determines which two of the four possible segments can occur where the segments are shown in FIGS. 3A-3D. Of the two segments which can occur, one is at the high frequency $f_2$ and the other is at the low frequency $f_1$. Curve 95 in FIG. 6A shows the waveform at frequency $f_2$, which is also as shown in the interval 0 to T by curve 152 in FIG. 2L. Curve 96 in FIG. 6C corresponds to the other waveform at $f_2$ which corresponds to curve 152 in FIG. 2L during the interval from 2T to 3T. The stored samples for the waveforms shown in FIGS. 6A and 6C correspond to the samples shown in FIGS. 3A and 3C. Curve 97 in FIG. 6B corresponds to curve 152 in FIG. 2L from T to 2T. Curve 98 in FIG. 6D corresponds to curve 152 in FIG. 2L from 3T to 4T. Curves 97 and 98 in FIGS. 6B and 6D, respectively, show the waveforms for frequency $f_1$ and correspond to the sampling shown in FIGS. 3B and 3D. The starting phase of waveforms 6A-6D with frequencies $f_1$ or $f_2$ of the first bit or chip of a sequence is arbitrary. The starting phase is determined by the initial condition of the circuits, which may include the state of latches 79, 80 and 87 as well as the state of flip flop 92.

In operation the output waveform on line 86 from Exclusive OR circuit 85 determines the minimum shift keyed modulated bit frequency wherein a 1 indicates $f_2$ is desired and a 0 indicates $f_1$ is desired. The output of Exclusive OR circuit 85 is used as the most significant bit of, for example, a three bit address to memory 88. The output of Exclusive OR circuit 85 selects, in memory 88, one of two $f_2$ waveforms such as shown in FIGS. 6A and 6C where line 86 is a 1 and one of two $f_1$ waveforms such as shown in FIGS. 6B and 6D where line 86 is a 0. The output of Exclusive OR circuit 85 is delayed one chip period in latch 87 and applied to a flip flop 92. The state of flip flop 92 determines the phase of the selected frequency waveform segments with its initial state arbitrary. As may be seen in FIGS. 6A and 6C, curve 95 begins low and ends high and curve 96 begins high and ends low. Curves 95 and 96 end with a 180° phase difference than its starting phase so that whenever a high frequency bit is selected, the state of flip flop 92 is changed for the next chip period. Since the low frequency voltage segments as shown by curves 97 and 98 in FIGS. 6B and 6D end with its starting phase, flip flop 92 does not change state for the next succeeding chip period. The output of flip flop 92 on line 93 provides the next significant bit of the memory address for memory 88. The output of flip flop 92 choses the voltage segment for a frequency $f_2$ or $f_1$ starting with 0 phase for a 1 and $\pi$ phase for a 0.

Address lines 86 and 93 provide for readout from memory 88 of the samples of a selected voltage segment having the appropriate frequency $f_1$ or $f_2$ and the appropriate phase 0 or $\pi$. As shown in FIGS. 6A-6D, curves 95-98 are each sampled twice during one chip or time interval T. Therefore, a third bit of the memory 88 address is the least significant bit of counter 70 running at twice the chip rate $f_{2c}$. Since the stored waveform samples contain only three different amplitudes, 1, 0 or $-1$, each waveform sample may be stored using two bit words. In response to an address on lines 86, 93 and 94 to memory 88, a two bit word, for example, representing one sample of a waveform is provided on line 89 to digital-to-analog converter 90. The output of digital-to-analog converter 90 is coupled over line 101 to an input of gate 102 which may be, for example, a digital AND gate. A second input of gate 102 is coupled over line 71 from an output of flip flop 59. Gate 102 functions to pass the output of digital-to-analog converter 90 for its proper length in time to inhibit transient levels. Further, gate 102 may be an analog AND gate where the lesser voltage of the two voltages at the two inputs is passed to the output. The output of gate 102 is coupled over line 103 to an input of bandpass filter 104.

The spectrum of the signal on line 103 is repetitious at twice the sampling rate, which is at $f_{2c}$ which is also twice the chipping rate. The minimum shift keyed modulated spectrum at the output of gate 102 is defined by equation (8).

$$f_N = (5/4 + 4N)f_c \tag{8}$$

In equation (8) $f_c$ is the chipping frequency and N is an integer.

To obtain the spectrum centered at $f_0$, a bandpass filter 104 centered on $5/4 f_c$ with a bandwidth of approximately $1.5 f_0$ is used to reject the undesired frequencies.

The modulated waveform at N equal to any other value can be obtained by tuning the bandpass filter to the center frequency $f_N$ as defined in equation (8). FIG. 7 shows one example of the minimum shift keyed modulated spectrum on line 103 of FIG. 5. The output of bandpass filter 104, on line 105, is shown in FIG. 8 for N=0. In FIG. 7 the ordinate represents voltage and the abscissa represents frequency.

One example of the data stored in memory 88 is shown in Table I as a function of address. Referring to FIG. 6A, a memory address of 100 corresponds to a frequency of $f_2$ with a phase starting at $\pi$. The first sample is taken at NT which is the very lowest value set at 00 and the next sample is taken at $(N+\frac{1}{2})T$ with a value of 01. Address 010 corresponds to curve 97 shown in FIG. 6B where the first sample has the highest binary value of 10 and the next sample the lowest binary value of 00. Waveform 6B has a frequency $f_1$ and a phase of 0. Values 00, 01 and 10 in Table I may correspond to $-1$, 0 and 1, respectively, in FIGS. 3A-3D and 6A-6D.

TABLE I

| D/A Output (Line 105) | Memory Address line 86, 93, 94 | Sample 1 at NT Value | Sample 2 at (N + ½)T Value | Frequency $f_1$ | Frequency $f_2$ | Phase 0 | Phase $\pi$ | FIG. |
|---|---|---|---|---|---|---|---|---|
| −1 | 100 | 00 | — | — | X | — | X | 6A |
| 0 | 101 | — | 01 | — | X | — | X | 6A |
| +1 | 010 | 10 | — | X | — | X | — | 6B |
| −1 | 011 | — | 00 | X | — | X | — | 6B |
| +1 | 110 | 10 | — | — | X | X | — | 6C |
| 0 | 111 | — | 01 | — | X | X | — | 6C |
| −1 | 000 | 00 | — | X | — | — | X | 6D |
| +1 | 001 | — | 10 | X | — | — | X | 6D |

An apparatus for generating a minimum shift keyed waveform has been described incorporating a code generator for generating a spreading function to provide a first plurality of bits in series representative of a binary code, an Exclusive OR circuit for multiplying the bit in each bit position of the first plurality of bits by the bit in the prior bit position to provide a second plurality of bits in series, means for generating a plurality of predetermined binary constants in response to the value of each of the second plurality of bits in series and as a function of the value of the preceding bit of the second plurality of bits, a digital-to-analog converter for generating an analog voltage from the predetermined binary constants, and means for coupling at a predetermined time the analog voltage to a bandpass filter having a predetermined frequency bandpass.

The invention claimed is:

1. Apparatus for generating a minimum shift keyed waveform comprising:
    first means for generating a first plurality of bits in series representative of a binary code,
    means for multiplying the bit in each bit position of said first plurality of bits by the bit in the preceding bit position to provide a second plurality of bits in series,
    a memory for storing a plurality of predetermined constants indicative of samples of said minimum shift keyed waveforms and for retrieving a portion of said predetermined constants corresponding to at least two of said samples in response to the value of each of said second plurality of bits in series and as a function of the value of the adjacent preceding bit of said second plurality of bits,
    second means for generating at least two analog voltages from said portion of said predetermined constants corresponding to at least two of said samples, and
    means for coupling at predetermined times said at least two analog voltages to a bandpass filter having a predetermined frequency bandpass.

2. The apparatus of claim 1 wherein said means for multiplying includes an Exclusive OR circuit.

3. The apparatus of claim 1 wherein said means for multiplying includes a first and second latch for holding a bit and the preceding bit of said first plurality of bits.

4. The apparatus of claim 1 wherein said memory provides said portion of said predetermined constants in response to an address word, said address word formed from the value of one of said second plurality of bits and from the value determined by a flip flop, said flip flop having an arbitrary initial state and changing states at times said preceding bit of said one of said second plurality of bits is a one.

5. The apparatus of claim 4 wherein said portion of said predetermined constants represents one of said samples of said minimum shift keyed waveform at the beginning of an interval defined by the inverse of the chipping rate.

6. The apparatus of claim 4 wherein said portion of said predetermined constants represents one of said samples of said minimum shift keyed waveform at the middle of an interval defined by the inverse of the chipping rate.

7. The apparatus of claim 4 wherein said memory further includes in its address word a signal indicative of timing within an interval defined by the inverse of said chipping rate.

8. The apparatus of claim 1 wherein said plurality of predetermined constants is selected from three values.

9. The apparatus of claim 1 wherein said portion of said predetermined constants are indicative of at least two samples of one of four unique voltage segments of said minimum shift keyed waveform.

10. The apparatus of claim 9 wherein said four unique voltage segments are $V = -\cos 2 (f_0 + f_m)t,$ $V = \cos 2 (f_0 - f_m)t,$ $V = \cos 2 (f_0 + f_m)t,$ $V = \cos 2 (f_0 - f_m)t,$ respectively, where V represents voltage, $f_0$ represents apparent carrier frequency defined by $f_0 = (4N+1)f_c/4$ where N is an integer and $f_c$ is the chipping rate, $f_m$ is $f_c/4$ and t is time.

11. A method for generating a minimum shift keyed waveform comprising the steps of generating a first plurality of bits in series representative of a binary code, multiplying the bit in each bit position of said first plurality of bits by the bit in the preceding bit position to provide a second plurality of bits in series, storing a plurality of predetermined constants indicative of samples of said minimum shift keyed waveform, retrieving a portion of said predetermined constants corresponding to at least two samples in response to the value of each of said second plurality of bits in series and as a function of the value of the preceding bit of said second plurality of bits, generating at least two analog voltages from said portion of predetermined constant corresponding to said at least two samples, and coupling at predetermined times said at least two analog voltages to a bandpass filter having a predetermined frequency bandpass.

12. Apparatus for generating a minimum shift keyed waveform containing a binary code comprising:
   means for holding a first plurality of bits in series representative of said binary code,
   means for multiplying the bit in each bit position of said first plurality of bits by the bit in the preceding bit position to provide a second plurality of bits in series,
   means for storing a plurality of constants representative of a plurality of unique waveform segments that may be combined in series to form said minimum shift keyed waveform containing said binary code,
   said means for storing including means for retrieving a portion of said constants associated with said waveform segments respectively in response to respective address words, said address words formed by the value of each said second plurality of bits in series and by the value of a binary bit which is changed in value at times the preceding bit of said second plurality of bits is a first predetermined value,
   means for generating a plurality of analog voltages from said retrieved constants, and
   means for coupling at predetermined times said plurality of analog voltages to a bandpass filter having a predetermined frequency bandpass.

13. The apparatus of claim 12 wherein said means for multiplying includes an Exclusive OR circuit.

14. The apparatus of claim 12 wherein said means for multiplying includes a first and second latch for holding a bit and the preceding bit of said first plurality of bits.

15. The apparatus of claim 12 wherein said means for storing includes a memory.

16. The apparatus of claim 12 wherein said waveform segments occur during a time interval defined by the inverse of the chipping rate of said minimum shift keyed waveform.

17. The apparatus of claim 16 wherein said means for storing includes storing a constant associated with the beginning of a waveform segment.

18. The apparatus of claim 16 wherein said means for storing includes storing a constant associated with the middle of a waveform segment.

19. The apparatus of claim 12 wherein said plurality of constants is selected from three values.

20. The apparatus of claim 12 wherein said means for generating includes a digital-to-analog converter.

21. The apparatus of claim 12 wherein said frequency bandpass of said bandpass filter is centered on $5/4\ f_c$, where $f_c$ is the chipping rate of said minimum shift keyed waveform.

22. The apparatus of claim 12 wherein said means for storing includes storing a portion of said constants associated with one of said waveform segments indicative of at least two samples of said waveform segment.

23. The apparatus of claim 12 wherein said means for storing includes storing a plurality of constants representative of at least two samples of each of four unique waveform segments given by $$V = -\cos 2 (f_0+f_m)t$$

$$V = \cos 2 (f_0-f_m)t$$

$$V = \cos 2 (f_0+f_m)t$$

$$V = -\cos 2 (f_0-f_m)t,$$

respectively, where V represents voltage, $f_0$ represents apparent carrier frequency defined by $f_0 = (4N+1)f_c/4$ where N is an integer and $f_c$ is the chipping rate, $f_m$ is $f_c/4$ and t is time.

24. A method for generating a minimum shift keyed waveform containing a binary code comprising the steps of:
   holding a first plurality of bits in series representative of said binary code,
   multiplying the bit in each bit position of said first plurality of bits by the bit in the preceding bit position to provide a second plurality of bits in series,
   storing a plurality of constants representative of a plurality of unique waveform segments that may be combined in series to form said minimum shift keyed waveform containing said binary code,
   retrieving a portion of said constants associated with said waveform segments respectively in response to respective address words, said address words formed by the value of each said second plurality of bits in series and by the value of a binary bit which is changed in value at times the preceding bit of said second plurality of bits is a first predetermined value,
   generating a plurality of analog voltages from said retrieved constants, and
   coupling at predetermined times said plurality of analog voltages to a bandpass filter having a predetermined frequency bandpass.

* * * * *